US012665938B2

(12) United States Patent
Tanaka

(10) Patent No.: US 12,665,938 B2
(45) Date of Patent: Jun. 23, 2026

(54) ELECTRONIC CONFERENCE SUPPORT SYSTEM, ELECTRONIC CONFERENCE SUPPORT METHOD, AND RECORDING MEDIUM

(71) Applicant: HONDA MOTOR CO., LTD., Tokyo (JP)

(72) Inventor: Ryosuke Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 18/785,974

(22) Filed: Jul. 26, 2024

(65) Prior Publication Data

US 2025/0047726 A1     Feb. 6, 2025

(30) Foreign Application Priority Data

Jul. 31, 2023     (JP) ................................. 2023-124148

(51) Int. Cl.
*H04L 65/403*          (2022.01)
*B60R 1/29*            (2022.01)
*H04L 67/12*           (2022.01)
(52) U.S. Cl.
CPC ............ *H04L 65/403* (2013.01); *H04L 67/12* (2013.01); *B60R 1/29* (2022.01)

(58) Field of Classification Search
CPC .......... H04L 65/403; H04L 67/12; B60R 1/29
USPC ......................................................... 709/204
See application file for complete search history.

(56) References Cited

U.S. PATENT DOCUMENTS

| | | | |
|---|---|---|---|
| 10,362,068 B2 * | 7/2019 | Sugioka .............. | H04L 65/1066 |
| 2019/0302583 A1 | 10/2019 | Taniguchi et al. | |
| 2020/0233637 A1 * | 7/2020 | Vartakavi .............. | G06F 16/639 |
| 2024/0034332 A1 * | 2/2024 | Agrawal .............. | G06V 20/597 |
| 2025/0193258 A1 * | 6/2025 | Li ......................... | H04L 65/403 |

FOREIGN PATENT DOCUMENTS

JP          2019-174693 A      10/2019

* cited by examiner

*Primary Examiner* — Zi Ye
(74) *Attorney, Agent, or Firm* — Rankin, Hill & Clark LLP

(57)          ABSTRACT
An electronic conference support system includes a movement condition information acquisition unit which acquires movement condition information indicating a movement condition of the moving body, a conference handling difficulty degree determination unit which makes a determination about a difficulty degree for a driver in handling of an electronic conference based on the movement condition information, and a conference handling difficulty degree information providing unit which transmits conference handling difficulty degree information indicating the difficulty degree to a terminal device used by an outside participant for participating in the electronic conference in a case where an electronic conference participation recognition unit recognizes that the driver is engaged in the electronic conference with the outside participant.

9 Claims, 3 Drawing Sheets

FIG.2

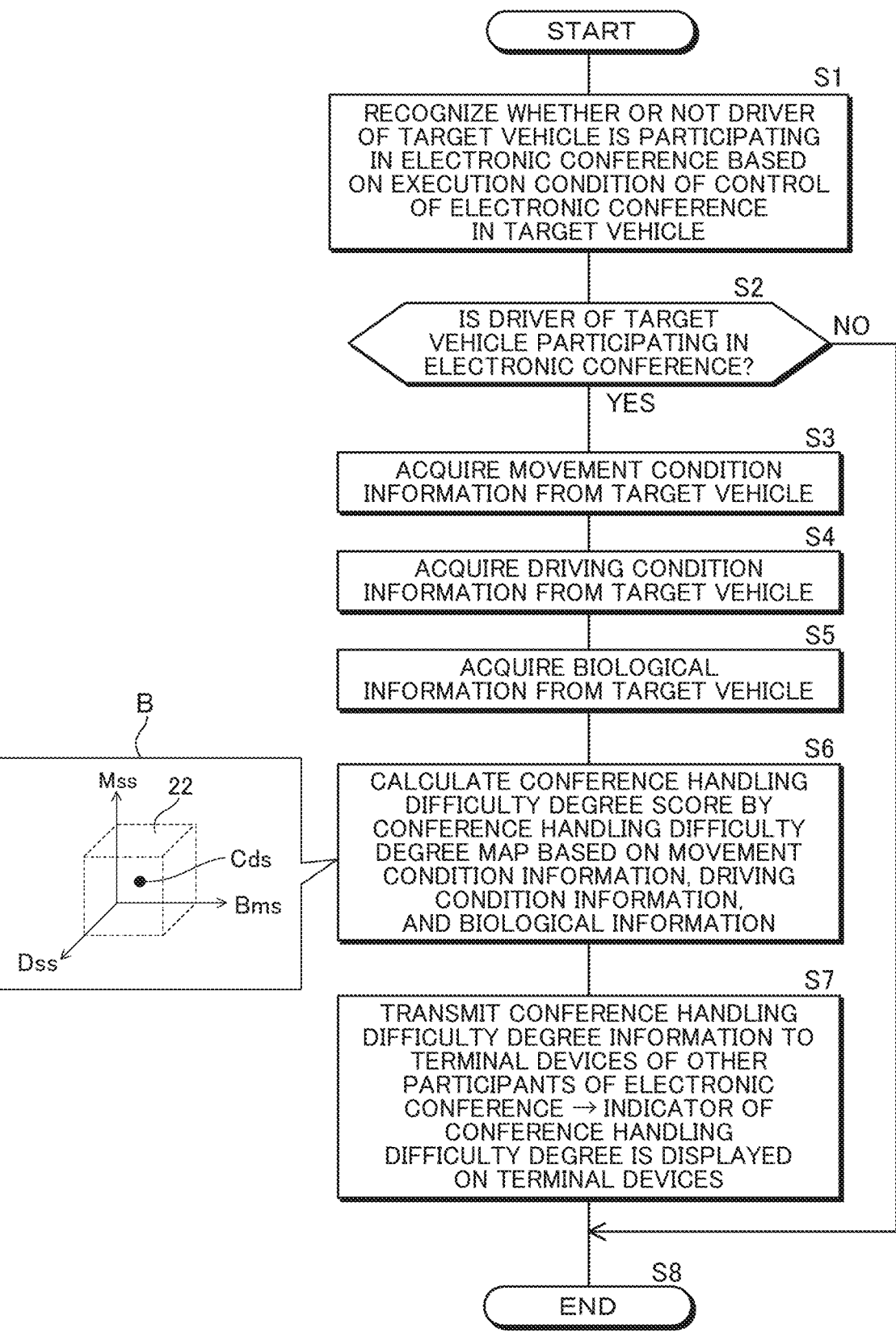

START

S1
RECOGNIZE WHETHER OR NOT DRIVER OF TARGET VEHICLE IS PARTICIPATING IN ELECTRONIC CONFERENCE BASED ON EXECUTION CONDITION OF CONTROL OF ELECTRONIC CONFERENCE IN TARGET VEHICLE

S2
IS DRIVER OF TARGET VEHICLE PARTICIPATING IN ELECTRONIC CONFERENCE?          NO

YES

S3
ACQUIRE MOVEMENT CONDITION INFORMATION FROM TARGET VEHICLE

S4
ACQUIRE DRIVING CONDITION INFORMATION FROM TARGET VEHICLE

S5
ACQUIRE BIOLOGICAL INFORMATION FROM TARGET VEHICLE

S6
CALCULATE CONFERENCE HANDLING DIFFICULTY DEGREE SCORE BY CONFERENCE HANDLING DIFFICULTY DEGREE MAP BASED ON MOVEMENT CONDITION INFORMATION, DRIVING CONDITION INFORMATION, AND BIOLOGICAL INFORMATION

B
Mss
22
Cds
Bms
Dss

S7
TRANSMIT CONFERENCE HANDLING DIFFICULTY DEGREE INFORMATION TO TERMINAL DEVICES OF OTHER PARTICIPANTS OF ELECTRONIC CONFERENCE → INDICATOR OF CONFERENCE HANDLING DIFFICULTY DEGREE IS DISPLAYED ON TERMINAL DEVICES

S8
END

ELECTRONIC CONFERENCE SUPPORT SYSTEM, ELECTRONIC CONFERENCE SUPPORT METHOD, AND RECORDING MEDIUM

INCORPORATION BY REFERENCE

The present application claims priority under 35 U.S.C. § 119 to Japanese Patent Application No. 2023-124148 filed on Jul. 31, 2023. The content of the application is incorporated herein by reference in its entirety.

BACKGROUND OF THE INVENTION

Field of the Invention

The present invention relates to an electronic conference support system, an electronic conference support method, and a recording medium.

Description of the Related Art

In recent years, efforts to provide access to sustainable transportation systems in which vulnerable populations such as seniors, people with disabilities, and children among transport users are taken into consideration have been gaining momentum. In order to realize this, research and development has been focused on further improving the safety and convenience of transport through development of livability of vehicles.

For example, Japanese Patent Laid-Open No. 2019-174693 discloses a configuration in which when an occupant of a vehicle participates in an electronic conference, switching between output and non-output from a speaker in the vehicle and adjustment of sensitivity of a microphone for a voice of the occupant are performed in accordance with a state of the vehicle.

However, with regard to the livability of a vehicle, a driver of the vehicle has to handle both of driving of the vehicle and an electronic conference when the driver is participating in the electronic conference, and there are cases where handling of the electronic conference is restricted to give priority to the driving of the vehicle depending on a traveling condition of the vehicle. In this case, it becomes difficult for other participants outside of the vehicle who are participating in the electronic conference to maintain smooth communication with the driver. Accordingly, a purpose of the present application is to support smooth communication with the driver for participants outside of the vehicle who participate in the electronic conference and are engaged in the electronic conference with the driver of the vehicle.

The present application has been made for achieving the above purpose, and an object thereof is to provide an electronic conference support system, an electronic conference support method, and a recording medium that can support smooth communication with a driver for a participant outside of a moving body who is engaged in an electronic conference with the driver of the moving body such as a vehicle. Further, contribution is made to progress of a sustainable transportation system.

SUMMARY OF THE INVENTION

As a first aspect for achieving the above object, an electronic conference support system is raised, the electronic conference support system including: an electronic conference participation recognition unit which recognizes that a driver of a moving body is engaged in an electronic conference with an outside participant outside of the moving body; a movement condition information acquisition unit which acquires movement condition information indicating a movement condition of the moving body; a conference handling difficulty degree determination unit which makes a determination about a difficulty degree for the driver in handling of the electronic conference based on the movement condition information; and a conference handling difficulty degree information providing unit which transmits conference handling difficulty degree information indicating the difficulty degree to a terminal device used by the outside participant for participating in the electronic conference in a case where the electronic conference participation recognition unit recognizes that the driver is engaged in the electronic conference with the outside participant.

The above electronic conference support system may be configured to further include a driving condition information acquisition unit which acquires driving condition information indicating a driving condition of the moving body and may be configured such that the conference handling difficulty degree determination unit makes a determination about the difficulty degree based on the movement condition information and the driving condition information.

The above electronic conference support system may be configured to further include a biological information acquisition unit which acquires biological information of the driver and may be configured such that the conference handling difficulty degree determination unit makes a determination about the difficulty degree based on the movement condition information and the biological information.

The above electronic conference support system may be configured to further include a driving condition information acquisition unit which acquires driving condition information indicating a driving condition of the moving body and may be configured such that the conference handling difficulty degree determination unit makes a determination about the difficulty degree based on the movement condition information, the biological information, and the driving condition information.

The above electronic conference support system may be configured such that the movement condition information includes at least either one of a moving speed of the moving body and a function state of a traffic signal which is present in front of the moving body.

The above electronic conference support system may be configured such that the driving condition information includes at least any one of a driving operation condition of the moving body by the driver, a function state of a driving assistance function included in the moving body, and a function state of an autonomous driving function included in the moving body.

The above electronic conference support system may be configured such that the driving condition information includes an operation frequency of a driving operation unit of the moving body by the driver and the conference handling difficulty degree determination unit determines that the difficulty degree is higher as the operation frequency of the driving operation unit becomes higher, the operation frequency being recognized from the driving condition information.

The above electronic conference support system may be configured such that the biological information includes at least either one of a visual line of the driver, the visual line being recognized from an image of the driver, the image being photographed by a camera included in the moving body, and detection information of a biological sensor included in the moving body.

As a second aspect for achieving the above object, an electronic conference support method being executed by a computer is raised, the electronic conference support method including: an electronic conference participation recognition step of recognizing that a driver of a moving body is engaged in an electronic conference with an outside participant outside of the moving body; a movement condition information acquisition step of acquiring movement condition information indicating a movement condition of the moving body; a conference handling difficulty degree determination step of making a determination about a difficulty degree for the driver in handling of the electronic conference based on the movement condition information; and a conference handling difficulty degree information providing step of transmitting conference handling difficulty degree information indicating the difficulty degree to a terminal device used by the outside participant for participating in the electronic conference in a case where a fact that the driver is engaged in the electronic conference with the outside participant is recognized by the electronic conference participation recognition step.

As a third aspect for achieving the above object, a non-transitory recording medium is raised, the recording medium storing a program that causes a computer to function as: an electronic conference participation recognition unit which recognizes that a driver of a moving body is engaged in an electronic conference with an outside participant outside of the moving body; a movement condition information acquisition unit which acquires movement condition information indicating a movement condition of the moving body; a conference handling difficulty degree determination unit which makes a determination about a difficulty degree for the driver in handling of the electronic conference based on the movement condition information; and a conference handling difficulty degree information providing unit which transmits conference handling difficulty degree information indicating the difficulty degree to a terminal device used by the outside participant for participating in the electronic conference in a case where the electronic conference participation recognition unit recognizes that the driver is engaged in the electronic conference with the outside participant.

The above electronic conference support system, electronic conference support method, and program can support smooth communication with the driver for participants outside of the moving body who are engaged in the electronic conference with the driver of the moving body such as a vehicle.

BRIEF DESCRIPTION OF DRAWINGS

FIG. 2 is a flowchart of a providing process of conference handling difficulty degree information.

DETAILED DESCRIPTION OF THE PREFERRED EMBODIMENTS

1. Configuration of Electronic Conference Support System

Figure 1:
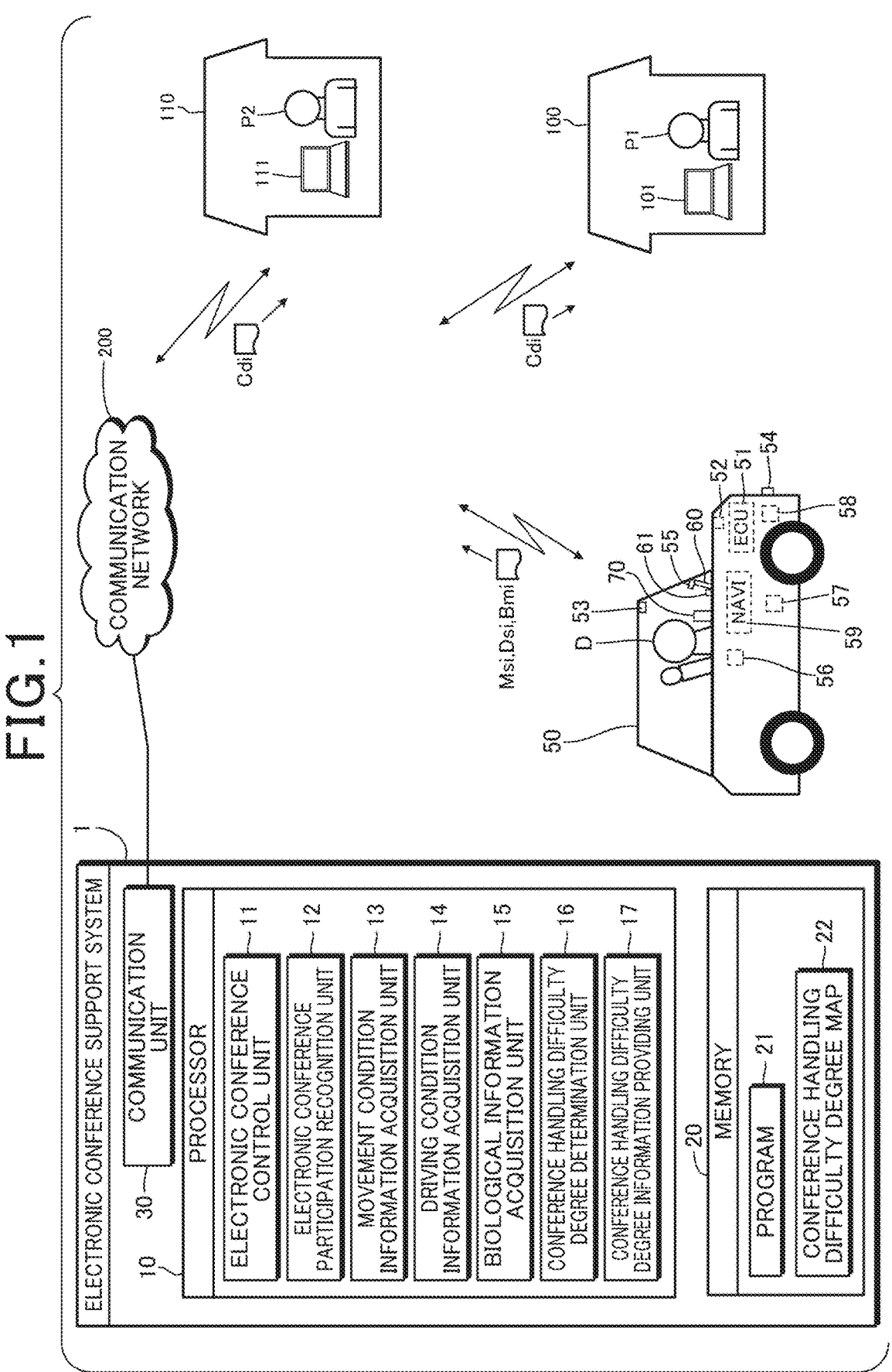
FIG. 1 is a configuration diagram of a vehicle including an electronic conference support system.

A configuration of an electronic conference support system 1 of the present disclosure will be described with reference to FIG. 1. FIG. 1 illustrates, as an example, a condition where the electronic conference support system 1 supports an electronic conference held among a driver D of a vehicle 50 and other participants P1 and P2 outside of the vehicle 50. The vehicle 50 corresponds to a moving body of the present disclosure. The participants P1 and P2 correspond to outside participants of the present disclosure.

The vehicle 50 includes an electronic control unit (ECU) 51 which controls functions of the vehicle 50, a communication unit 52 which performs communication with the electronic conference support system 1 or the like via a communication network 200, a front camera 53 which photographs an area ahead of the vehicle 50, a radar 54 which detects a position of a target object present in front of the vehicle 50, an in-vehicle camera 55 which photographs the driver D, a biological sensor (vital sensor) group 56 which is provided in a driver seat or the like and detects biological information (such as a heart rate, pulses, and sweating) of the driver D, an operation-unit sensor group 57 which detects operation states of driving operation units (such as an accelerator pedal, a brake pedal, and a steering wheel), a traveling condition sensor group 58 which detects a traveling condition (such as a speed, an acceleration, or a yaw rate) of the vehicle 50, a navigation device 59 which provides route guidance based on map information, a display 60 with a touch panel specifications, and a microphone 61.

The ECU 51 is configured with a single or a plurality of ECUs, and the driver D uses an electronic conference application (application program) which is executed by the ECU 51, thereby accesses the electronic conference support system 1, and participates in the electronic conference. Note that the driver D can participate in the electronic conference by using the electronic conference application which is installed by a portable terminal 70. The portable terminal 70 is a smartphone, a cellular phone, a tablet terminal, or the like. The driver D performs a touch operation of the display 60 while visually recognizing an electronic conference screen displayed on the display 60 and thereby communicates with the other participants P1 and P2.

The ECU 51 includes an autonomous driving function which executes control of autonomous driving of the vehicle 50 and a driving assistance function which assists a driving operation of the vehicle 50 by the driver D, the autonomous driving function and the driving assistance function being based on a photographed image of the area ahead of the vehicle 50 by the front camera 53 and a position or the like of a target object in front of the vehicle 50, the position or the like of the target object being detected by the radar 54.

When the driver D is participating in the electronic conference, the ECU 51 transmits, at predetermined timings, movement condition information Msi which indicates a movement condition of the vehicle 50, driving condition information Dsi which indicates a driving condition of the vehicle 50, and biological information Bmi of the driver D to the electronic conference support system 1. The movement condition information Msi includes the speed, the acceleration, the yaw rate, and so forth of the vehicle 50 which are detected by the traveling condition sensor group 58, a function state of a traffic signal in front of the vehicle 50, the function state being recognized from the photographed image by the front camera 53, a condition of a road (such as an ordinary road in a city area, a mountain road, or a limited-access road for vehicles) on which the vehicle 50 travels, the condition of the road being recognized by the navigation device 59, and so forth.

The driving condition information Dsi includes the driving condition (manual driving, presence or absence of use of the driving assistance function, or autonomous driving) of the vehicle 50 and operation amounts, an operation frequency, and so forth of the accelerator pedal, the brake pedal, the steering wheel, and so forth, which are detected by the operation-unit sensor group 57. The biological information Bmi includes a direction of a visual line of the driver D, which is recognized from the photographed image by the in-vehicle camera 55, levels of the heart rate, the pulses, and the sweating of the driver D, which are detected by the biological sensor group 56, and so forth.

The participant P1 uses the electronic conference application by operating a terminal device 101 from a house 100 such as an own home, thereby accesses the electronic conference support system 1, and participates in the electronic conference. The terminal device 101 is a personal computer, a tablet terminal, a smartphone, or the like and has a function of performing communication via the communication network 200. The participant P1 operates the terminal device 101 while visually recognizing the electronic conference screen displayed on a display unit of the terminal device 101 and thereby communicates with the driver D and the participant P2. Similarly, the participant P2 operates a terminal device 111 from a house 110, accesses the electronic conference support system 1, thereby participates in the electronic conference, and communicates with the driver D and the participant P1.

The electronic conference support system 1 is a computer system which includes a processor 10, a memory 20, a communication unit 30, and so forth. In the memory 20, a program 21 for controlling the electronic conference support system 1 and a conference handling difficulty degree map 22 for making a determination about a conference handling difficulty degree, which will be described later, are saved. The program 21 may be read out from a recording medium (such as a magnetic disk, an optical disk, or a flash memory) and be saved in the memory 20 or may be downloaded from an external server or the like via the communication network 200 and be saved in the memory 20.

The processor 10 reads and executes the program 21 and thereby functions as an electronic conference control unit 11, an electronic conference participation recognition unit 12, a movement condition information acquisition unit 13, a driving condition information acquisition unit 14, a biological information acquisition unit 15, a conference handling difficulty degree determination unit 16, and a conference handling difficulty degree information providing unit 17. A process executed by the electronic conference participation recognition unit 12 corresponds to an electronic conference participation recognition step in an electronic conference support method of the present disclosure, and a process executed by the movement condition information acquisition unit 13 corresponds to a movement condition information acquisition step in the electronic conference support method of the present disclosure. A process executed by the conference handling difficulty degree determination unit 16 corresponds to a conference handling difficulty degree determination step in the electronic conference support method of the present disclosure, and a process executed by the conference handling difficulty degree information providing unit 17 corresponds to a conference handling difficulty degree information providing step in the electronic conference support method of the present disclosure.

The electronic conference control unit 11 controls communication among the vehicle 50 (more specifically, the ECU 51), the terminal device 101, and the terminal device 111 via the communication network 200 and thereby provides the service of conducting the electronic conference by the driver D, the participant P1, and the participant P2. The electronic conference participation recognition unit 12 recognizes that the driver D is participating in the electronic conference from a control condition of the electronic conference by the electronic conference control unit 11.

The movement condition information acquisition unit 13 receives, by the communication unit 30, the movement condition information Msi transmitted from the vehicle 50 and thereby acquires the movement condition information Msi. The driving condition information acquisition unit 14 receives, by the communication unit 30, the driving condition information Dsi transmitted from the vehicle 50 and thereby acquires the driving condition information Dsi. The biological information acquisition unit 15 receives, by the communication unit 30, the biological information Bmi transmitted from the vehicle 50 and thereby acquires the biological information Bmi.

Based on the movement condition information Msi, the driving condition information Dsi, and the biological information Bmi, the conference handling difficulty degree determination unit 16 makes a determination about a difficulty degree for the driver D in handling of the electronic conference. Specifically, the conference handling difficulty degree determination unit 16 executes the following processes and thereby obtains a conference handling difficulty degree score Cds which indicates the difficulty degree for the driver D in handling of the electronic conference.

(1. Calculation of Movement Condition Score)

The conference handling difficulty degree determination unit 16 sets a movement condition score Mss corresponding to the movement condition information Msi in accordance with the following rules (1-1) to (1-4). The movement condition score Mss is set higher as the difficulty degree for the driver D in handling of the electronic conference becomes higher.

(1-1) The movement condition score Mss is set higher as a traveling speed of the vehicle 50 becomes higher.

(1-2) As for the function state of the traffic signal in front of the vehicle 50, the movement condition score Mss is set higher in a case where the traffic signal is green than in a case where the traffic signal is red.

(1-3) As for a road on which the vehicle 50 is traveling, the movement condition score Mss is set higher in a case of traveling on a mountain road than in a case of traveling on a road in a city area.

(1-4) The movement condition score Mss is set high in cases where the vehicle 50 is traveling in an intersection, is traveling on a road having a narrow road width, is traveling on a road with many blind spots, is passing by on a narrow road, is traveling in the rain (which is determined by a functioning speed of a wiper or by a raindrop sensor), and is traveling in a condition where a road surface condition is poor (whether many up-down motions occur is determined by an acceleration sensor), in a condition where noise around the vehicle 50 is loud, in a condition where an emergency vehicle approaches the vehicle 50, in a condition where a distance between the vehicle 50 and a front vehicle is a predetermined distance (variable based on the speed of the vehicle 50) or smaller, and in a condition where a position and a relative speed of a motorcycle traveling in a close area to the vehicle 50 with respect to the vehicle 50 satisfy predetermined approaching conditions.

US 12,665,938 B2

7

8

(2. Calculation of Driving Condition Score)

The conference handling difficulty degree determination unit 16 sets a driving condition score Dss corresponding to the driving condition information Dsi in accordance with the following rules (2-1) to (2-4). The driving condition score Dss is set higher as the difficulty degree for the driver D in handling of the electronic conference becomes higher.

(2-1) The driving condition score Dss is set higher in order of autonomous driving→manual driving (with a driving assistance)→manual driving (without the driving assistance).

(2-2) The driving condition score Dss is set higher when operation amounts of operation units (the accelerator pedal, the brake pedal, and the steering wheel) are larger.

(2-3) The driving condition score Dss is set higher as an operation frequency of the operation units becomes higher.

(2-4) The driving condition score Dss is set higher when a safety function (such as an emergency brake or a lane deviation warning) of the vehicle 50 is functioning or when the driver D uses a voice operation (when an assistant application has been started).

(3. Calculation of Biological Information Score)

The conference handling difficulty degree determination unit 16 sets a biological information score Bms corresponding to the biological information Bmi in accordance with the following rules (3-1) to (3-4). The biological information score Bms is set higher as the difficulty degree for the driver D in handling of the electronic conference becomes higher.

(3-1) The biological information score Bms is set higher as the visual line of the driver D is more stable (as the driver D is more carefully gazing at a specific target object).

(3-2) The biological information score Bms is set higher as the heat rate or a pulse rate of the driver D becomes higher.

(3-3) The biological information score Bms is set higher as a sweating amount of the driver D becomes larger.

(3-4) The biological information score Bms is set higher as glare of the sun or a headlight of an oncoming vehicle (which is determined by solar radiation angle calculation or by an image by the in-vehicle camera 55 (driver monitoring camera)), the glare being sensed by the driver D, is more intense. The biological information score Bms is set higher as disturbance (arrhythmias) in an electrocardiogram of the driver D becomes larger. The biological information score Bms is set higher as heightening of emotion of the driver D becomes higher, the heightening of emotion being recognized from a tone of voice (which informs the other party of emotion such as irritation) of the driver D.

The conference handling difficulty degree determination unit 16 applies the movement condition score Mss, the driving condition score Dss, and the biological information score Bms to the conference handling difficulty degree map 22 and thereby calculates the conference handling difficulty degree score Cds. As illustrated in a word balloon B in FIG. 2, the conference handling difficulty degree map 22 is a three-dimensional map which outputs the conference handling difficulty degree score Cds in response to inputs of the movement condition score Mss, the driving condition score Dss, and the biological information score Bms.

The conference handling difficulty degree map 22 is a map which is formed to correspond to a calculation result by the following expression (1), for example.

$$Cds = W1 \times Mss + W2 \times Dss + W3 \times Bms \qquad (1)$$

Here, Mss denotes the movement condition score, Dss denotes the driving condition score, Bms denotes the biological information score, and W1 to W3 denote weighting coefficients.

The terms W1 to W3 are set by demonstration experiments or computer simulations.

2. Providing Process of Conference Handling Difficulty Degree Information

A description will be made about execution procedures of a providing process of conference handling difficulty degree information, which is executed by the electronic conference support system 1, in accordance with a flowchart illustrated in FIG. 2. The electronic conference support system 1 repeatedly executes a process based on the flowchart illustrated in FIG. 2 when the driver D uses the vehicle 50 (which is indicated as a target vehicle in FIG. 2).

In step S1 in FIG. 2, the electronic conference participation recognition unit 12 recognizes whether or not the driver D of the vehicle 50 is participating in the electronic conference based on an execution condition of control of the electronic conference by the electronic conference control unit 11. In next step S2, the electronic conference participation recognition unit 12 moves the process to step S3 when the driver D is participating in the electronic conference but moves the process to step S8 when the driver D is not participating in the electronic conference.

In step S3, the movement condition information acquisition unit 13 acquires the movement condition information Msi by receiving that from the vehicle 50 via the communication network 200. In next step S4, the driving condition information acquisition unit 14 acquires the driving condition information Dsi by receiving that from the vehicle 50 via the communication network 200. In next step S5, the biological information acquisition unit 15 acquires the biological information Bmi by receiving that from the vehicle 50 via the communication network 200.

In next step S6, as described above, the conference handling difficulty degree determination unit 16 calculates the movement condition score Mss, the driving condition score Dss, and the biological information score Bms from the movement condition information Msi, the driving condition information Dsi, and the biological information Bmi. The conference handling difficulty degree determination unit 16 then applies the movement condition score Mss, the driving condition score Dss, and the biological information score Bms to the conference handling difficulty degree map 22 and thereby calculates the conference handling difficulty degree score Cds.

In next step S7, the conference handling difficulty degree information providing unit 17 transmits conference handling difficulty degree information Cdi including the conference handling difficulty degree score Cds to the terminal devices 101 and 111 which are used by the other participants P1 and P2 of the electronic conference.

Figure 3:
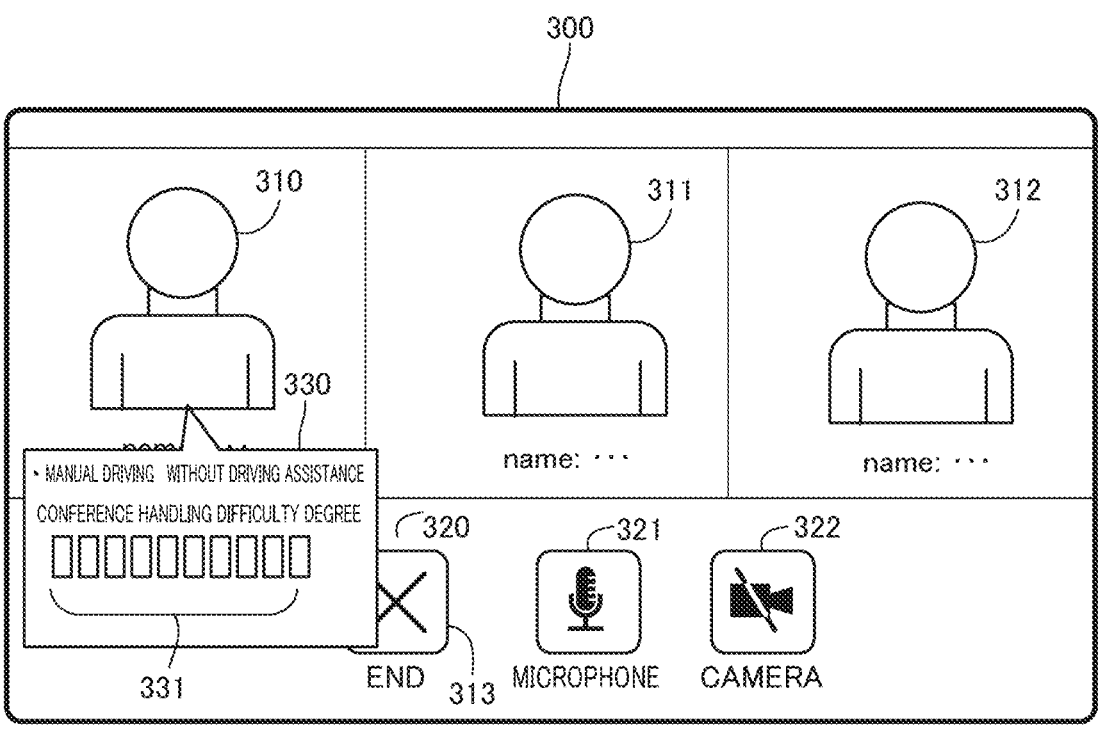
FIG. 3 is an explanatory diagram of a screen of an electronic conference, the screen being displayed on a terminal device outside of a vehicle.

Here, FIG. 3 illustrates an electronic conference screen 300 which is displayed on the display unit of each of the terminal devices 101 and 111. The electronic conference screen 300 displays an image 310 of the driver D participating in the electronic conference, an image 311 of the other participant P1, an image 312 of the other participant P2, a conference end button 320 for giving an instruction to leave from the electronic conference, a microphone button 321 for giving an instruction to turn on and off a microphone, and a camera button 322 for giving an instruction to turn on and off a camera.

When each of the terminal devices 101 and 111 receives the conference handling difficulty degree information Cdi which is transmitted from the electronic conference support system 1, the electronic conference application displays a conference handling difficulty degree notification image 330, which displays an indicator 331 with 10 levels corresponding to the conference handling difficulty degree score Cds, in an area close to the image 310 of the driver D. As the conference handling difficulty degree score Cds becomes higher (as the difficulty degree for the driver D in handling of the electronic conference becomes higher), in the indicator 331, a displayed range becomes longer (the number of displayed blocks becomes larger).

FIG. 3 illustrates an example where in the conference handling difficulty degree notification image 330, information about a driving state of "MANUAL DRIVING WITHOUT DRIVING ASSISTANCE" as factors taken into consideration in calculation of the conference handling difficulty degree score Cds is displayed together with the indicator 331. In addition to that, the traveling speed of the vehicle 50, a function state of a traffic signal in front of the vehicle 50, the operation amount of the accelerator pedal by the driver D, and so forth may be displayed in the conference handling difficulty degree notification image 330.

The other participants P1 and P2 can intuitively and quickly recognize the difficulty degree for the driver D in handling of the electronic conference from the length of the indicator 331. Taking into consideration the difficulty degree for the driver D in handling of the electronic conference, the other participants P1 and P2 can decide a timing for displaying materials, which are visually recognized in a shared manner, on the electronic conference screen 300 and a timing for asking a question to the driver D. Accordingly, smooth communication with the driver D can be supported for the other participants P1 and P2.

3. Other Embodiments

In the above embodiment, the driving condition information acquisition unit 14 and the biological information acquisition unit 15 are provided, and the conference handling difficulty degree determination unit 16 makes a determination about the conference handling difficulty degree (conference handling difficulty degree score Cds) based on the movement condition information Msi, the driving condition information Dsi, and the biological information Bmi. As another embodiment, only either one of the driving condition information acquisition unit 14 and the biological information acquisition unit 15 may be provided, and the determination about the conference handling difficulty degree may be made based on the movement condition information Msi and the driving condition information Dsi or based on the movement condition information Msi and the biological information Bmi. Alternatively, the driving condition information acquisition unit 14 and the biological information acquisition unit 15 may be omitted, and the determination about the conference handling difficulty degree may be made based only on the movement condition information Msi.

In the above embodiment, the electronic conference support system 1 is configured with one computer system which communicates with the vehicle 50 and the terminal devices 101 and 111. As another embodiment, a configuration is possible in which a part or whole of the electronic conference support system 1 is included in the ECU 51 or the like of the vehicle 50. For example, the electronic conference participation recognition unit 12, the movement condition information acquisition unit 13, the driving condition information acquisition unit 14, the biological information acquisition unit 15, and the conference handling difficulty degree determination unit 16 may be configured as functions of the ECU 51, the process up to the determination about the conference handling difficulty degree may be performed by the vehicle 50, and the conference handling difficulty degree information Cdi may be transmitted to the electronic conference support system 1. In this case, an electronic conference support system of the present disclosure is configured with the electronic conference support system 1 and the ECU 51. In addition, the conference handling difficulty degree information providing unit 17 may be configured as a function of the ECU 51, in this case, the electronic conference support system of the present disclosure is configured only with the ECU 51 of the vehicle 50, and the conference handling difficulty degree information Cdi is transmitted from the vehicle 50 to the terminal devices 101 and 111.

In the above embodiment, the driver D participates in the electronic conference by using the electronic conference application which is executed by the ECU 51, but in a case where the driver D participates in the electronic conference by using the electronic conference application which is executed by the portable terminal 70, the electronic conference control unit 11 recognizes a moving speed of the portable terminal 70 from position information of the portable terminal 70, the position information being transmitted from the portable terminal 70, for example, and thereby recognizes that the driver D is participating in the electronic conference. In this case, the movement condition information Msi, the driving condition information Dsi, and the biological information Bmi may be transmitted from the ECU 51 to the portable terminal 70, and the movement condition information Msi, the driving condition information Dsi, and the biological information Bmi may be transmitted from the portable terminal 70 to the electronic conference support system 1 via the communication network 200.

In the above embodiment, the vehicle 50 is described as the moving body of the present disclosure, but the moving body of the present disclosure may be an aircraft, a watercraft, or the like.

Note that FIG. 1 is an outline diagram which illustrates configurations of the electronic conference support system 1 while dividing those based on main processing contents for easy understanding of the invention of the present application, and the configurations of the electronic conference support system 1 may be configured based on other divisions. A process of each configuration element may be executed by one hardware unit or may be executed by a plurality of hardware units. The process by each of the configuration elements, which is illustrated in FIG. 2, may be executed by one program or may be executed by a plurality of programs.

4. Configurations Supported by Above Embodiments

The above embodiments are specific examples of the following configurations.

(Configuration 1) An electronic conference support system including: an electronic conference participation recognition unit which recognizes that a driver of a moving body is engaged in an electronic conference with an outside participant outside of the moving body; a movement condition information acquisition unit which acquires movement condition information indicating a movement condition of the moving body; a conference handling difficulty degree determination unit which makes a determination about a difficulty degree for the driver in handling of the electronic conference based on the movement condition information; and a conference handling difficulty degree information providing unit which transmits conference handling difficulty degree information indicating the difficulty degree to a terminal device used by the outside participant for participating in the electronic conference in a case where the electronic conference participation recognition unit recognizes that the driver is engaged in the electronic conference with the outside participant.

The electronic conference support system of the configuration 1 can support smooth communication with the driver for participants outside of the moving body who are engaged in the electronic conference with the driver of the moving body such as a vehicle.

(Configuration 2) The electronic conference support system described in the configuration 1, further including a driving condition information acquisition unit which acquires driving condition information indicating a driving condition of the moving body, in which the conference handling difficulty degree determination unit makes a determination about the difficulty degree based on the movement condition information and the driving condition information.

In the electronic conference support system of the configuration 2, based on the driving condition of the moving body which influences handling of the electronic conference by the driver, a determination can be made about the difficulty degree for the driver in handling of the electronic conference.

(Configuration 3) The electronic conference support system described in the configuration 1, further including a biological information acquisition unit which acquires biological information of the driver, in which the conference handling difficulty degree determination unit makes a determination about the difficulty degree based on the movement condition information and the biological information.

In the electronic conference support system of the configuration 3, based on the biological information of the driver which influences handling of the electronic conference by the driver, a determination can be made about the difficulty degree for the driver in handling of the electronic conference.

(Configuration 4) The electronic conference support system described in the configuration 3, further including a driving condition information acquisition unit which acquires driving condition information indicating a driving condition of the moving body, in which the conference handling difficulty degree determination unit makes a determination about the difficulty degree based on the movement condition information, the biological information, and the driving condition information.

In the electronic conference support system of the configuration 4, based on the movement condition of the moving body, the biological information of the driver, and the driving condition of the moving body, which influence handling of the electronic conference by the driver, a determination can precisely be made about the difficulty degree for the driver in handling of the electronic conference.

(Configuration 5) The electronic conference support system described in any one of the configuration 1 to the configuration 4, in which the movement condition information includes at least either one of a moving speed of the moving body and a function state of a traffic signal which is present in front of the moving body.

In the electronic conference support system of the configuration 5, taking into consideration a speed of the moving body or the function state of the traffic signal present in front of the moving body, the speed or the function state influencing an extent of attraction of attention of the driver to an area around the moving body, a determination can be made about the difficulty degree for the driver in handling of the electronic conference.

(Configuration 6) The electronic conference support system described in the configuration 2 or the configuration 4, in which the driving condition information includes at least any one of a driving operation condition of the moving body by the driver, a function state of a driving assistance function included in the moving body, and a function state of an autonomous driving function included in the moving body.

In the electronic conference support system of the configuration 6, in accordance with a driving load of the moving body for the driver, a determination can be made about the difficulty degree for the driver in handling of the electronic conference.

(Configuration 7) The electronic conference support system described in the configuration 2 or the configuration 4, in which the driving condition information includes an operation frequency of a driving operation unit of the moving body by the driver and the conference handling difficulty degree determination unit determines that the difficulty degree is higher as the operation frequency of the driving operation unit becomes higher, the operation frequency being recognized from the driving condition information.

In the electronic conference support system of the configuration 7, in a case where it is assumed that capability of handling the electronic conference is lowered because the operation frequency of the driving operation unit of the moving body by the driver is high and the driving load for the driver is high, it can be determined that the difficulty degree for the driver in handling of the electronic conference is high.

(Configuration 8) The electronic conference support system described in the configuration 3 or the configuration 4, in which the biological information includes at least either one of a visual line of the driver, the visual line being recognized from an image of the driver, the image being photographed by a camera included in the moving body, and detection information of a biological sensor included in the moving body.

In the electronic conference support system of the configuration 8, based on an actual condition of the body of the driver, a determination can be made about the difficulty degree for the driver in handling of the electronic conference.

(Configuration 9) An electronic conference support method being executed by a computer, the electronic conference support method including: an electronic conference participation recognition step of recognizing that a driver of a moving body is engaged in an electronic conference with an outside participant outside of the moving body; a movement condition information acquisition step of acquiring movement condition information indicating a movement condition of the moving body; a conference handling difficulty degree determination step of making a determination about a difficulty degree for the driver in handling of the electronic conference based on the movement condition information; and a conference handling difficulty degree information providing step of transmitting conference handling difficulty degree information indicating the difficulty degree to a terminal device used by the outside participant for participating in the electronic conference in a case where a fact that the driver is engaged in the electronic conference with the outside participant is recognized by the electronic conference participation recognition step.

By executing the electronic conference support method of the configuration 9 by a computer, similar work and effects to those of the electronic conference support system of the configuration 1 can be obtained.

(Configuration 10) A non-transitory recording medium storing a program that causes a computer to function as: an electronic conference participation recognition unit which recognizes that a driver of a moving body is engaged in an electronic conference with an outside participant outside of the moving body; a movement condition information acquisition unit which acquires movement condition information indicating a movement condition of the moving body; a conference handling difficulty degree determination unit which makes a determination about a difficulty degree for the driver in handling of the electronic conference based on the movement condition information; and a conference handling difficulty degree information providing unit which transmits conference handling difficulty degree information indicating the difficulty degree to a terminal device used by the outside participant for participating in the electronic conference in a case where the electronic conference participation recognition unit recognizes that the driver is engaged in the electronic conference with the outside participant.

By executing the program of the configuration 10 by a computer, a configuration of the electronic conference support system of the configuration 1 can be realized.

REFERENCE SIGNS LIST 1 electronic conference support system
10 processor
11 electronic conference control unit
12 electronic conference participation recognition unit
13 movement condition information acquisition unit
14 driving condition information acquisition unit
15 biological information acquisition unit
16 conference handling difficulty degree determination unit
17 conference handling difficulty degree information providing unit
20 memory
21 program
22 conference handling difficulty degree map
50 vehicle (moving body)
51 ECU
52 communication unit 53 front camera
54 radar
55 in-vehicle camera
56 biological sensor group
57 operation-unit sensor group
58 traveling condition sensor group
59 navigation device
60 display
61 microphone
70 portable terminal
101, 111 terminal device
200 communication network
300 electronic conference screen
310 image of driver
311,312 image of other participant
330 conference handling difficulty degree notification image
331 indicator
D driver
P1, P2 other participant

What is claimed is:

1. An electronic conference support system comprising a processor that communicates, via a communication network, with a control computer which is mounted on a moving body and which controls an operation of the moving body, and with a terminal device used by an outside participant outside of the moving body, wherein the processor:

recognizes that a driver of the moving body is engaged in an electronic conference with the outside participant;

acquires movement condition information indicating a movement condition of the moving body;

sets a movement condition score corresponding to the movement condition information, the movement condition score is set higher as a difficulty degree for the driver in handling of the electronic conference becomes higher based on the movement condition information;

acquires driving condition information indicating a driving condition of the moving body, the driving condition information being whether the moving body is manually driven, whether a driving assistance function is being used, or whether the moving body is autonomously driven;

sets a driving condition score corresponding to the driving condition information, the driving condition score is set higher as the difficulty degree for the driver in handling of the electronic conference becomes higher based on the driving condition information;

generates conference handling difficulty degree information indicating the difficulty degree based on the movement condition score set and the driving condition score set in a case where the processor recognizes that the driver is engaged in the electronic conference with the outside participant, transmits the conference handling difficulty degree information generated to the terminal device, and makes a display of the terminal device to display the conference handling difficulty degree information; and displays an indicator, on the display of the terminal device, corresponding to a conference handling difficulty degree score that is the conference handling difficulty degree information, and a display range of the indicator becomes longer as the conference handling difficulty degree score increases.

2. The electronic conference support system according to claim 1, wherein the processor acquires biological information of the driver, and makes a determination about the difficulty degree based on the movement condition information and the biological information.

3. The electronic conference support system according to claim 2, wherein the biological information includes at least either one of a visual line of the driver, the visual line being recognized from an image of the driver, the image being photographed by a camera included in the moving body, and detection information of a biological sensor included in the moving body.

4. The electronic conference support system according to claim 1, wherein the movement condition information includes at least either one of a moving speed of the moving body and a function state of a traffic signal which is present in front of the moving body.

5. The electronic conference support system according to claim 1, wherein the driving condition information includes an operation frequency of a driving operation unit of the moving body by the driver, and the processor sets the driving condition score higher as the operation frequency of the driving operation unit becomes higher, the operation frequency being recognized from the driving condition information.

6. The electronic conference support system according to claim 1, wherein, when the processor recognizes that the driver of the moving body is engaged in the electronic conference, the processor continuously acquires the movement condition information and the driving condition information, continuously sets the movement condition score and the driving condition score, continuously generates the conference handling difficulty degree information, continuously transmits the conference handling difficulty degree information generated to the terminal device, and continuously makes the display of the terminal device to display the conference handling difficulty degree information.

7. An electronic conference support method being executed by a computer, the electronic conference support method comprising:

a step of communicating, via a communication network, with a control computer which is mounted on a moving body and which controls an operation of the moving body, and with a terminal device used by an outside participant outside of the moving body;

an electronic conference participation recognition step of recognizing that a driver of the moving body is engaged in an electronic conference with the outside participant;

a movement condition information acquisition step of acquiring movement condition information indicating a movement condition of the moving body;

a movement condition score setting step of setting a movement condition score corresponding to the movement condition information, the movement condition score is set higher as a difficulty degree for the driver in handling of the electronic conference becomes higher based on the movement condition information;

a step of acquiring driving condition information indicating a driving condition of the moving body, the driving condition information being whether the moving body is manually driven, whether a driving assistance function is being used, or whether the moving body is autonomously driven;

a step of setting a driving condition score corresponding to the driving condition information, the driving condition score is set higher as the difficulty degree for the driver in handling of the electronic conference becomes higher based on the driving condition information;

a step of generating conference handling difficulty degree information indicating the difficulty degree based on the movement condition score set and the driving condition score set in a case where a fact that the driver is engaged in the electronic conference with the outside participant is recognized, transmitting the conference handling difficulty degree information generated to the terminal device, and making a display of the terminal device to display the conference handling difficulty degree information; and a step of displaying an indicator, on the display of the terminal device, corresponding to a conference handling difficulty degree score that is the conference handling difficulty degree information, and a display range of the indicator becomes longer as the conference handling difficulty degree score increases.

8. A non-transitory recording medium storing a program that causes a computer to:

communicate, via a communication network, with a control computer which is mounted on a moving body and which controls an operation of the moving body, and with a terminal device used by an outside participant outside of the moving body;

recognize that a driver of the moving body is engaged in an electronic conference with the outside participant;

acquire movement condition information indicating a movement condition of the moving body;

set a movement condition score corresponding to the movement condition information, the movement condition score is set higher as a difficulty degree for the driver in handling of the electronic conference becomes higher based on the movement condition information;

acquire driving condition information indicating a driving condition of the moving body, the driving condition information being whether the moving body is manually driven, whether a driving assistance function is being used, or whether the moving body is autonomously driven;

set a driving condition score corresponding to the driving condition information, the driving condition score is set higher as the difficulty degree for the driver in handling of the electronic conference becomes higher based on the driving condition information;

generate conference handling difficulty degree information indicating the difficulty degree based on the movement condition score set and the driving condition score set in a case where it is recognized that the driver is engaged in the electronic conference with the outside participant, transmit the conference handling difficulty degree information generated to the terminal device, and make a display of the terminal device to display the conference handling difficulty degree information; and display an indicator, on the display of the terminal device, corresponding to a conference handling difficulty degree score that is the conference handling difficulty degree information, and a display range of the indicator becomes longer as the conference handling difficulty degree score increases.

9. An electronic conference support system comprising a processor that communicates, via a communication network, with a control computer which is mounted on a moving body and which controls an operation of the moving body, and with a terminal device used by an outside participant outside of the moving body, wherein the processor:

recognizes that a driver of the moving body is engaged in an electronic conference with the outside participant;

acquires movement condition information indicating a movement condition of the moving body;

sets a movement condition score corresponding to the movement condition information, the movement condition score is set higher as a difficulty degree for the driver in handling of the electronic conference becomes higher based on the movement condition information;

acquires driving condition information indicating a driving condition of the moving body, the driving condition information being whether the moving body is manually driven, whether a driving assistance function is being used, or whether the moving body is autonomously driven;

sets a driving condition score corresponding to the driving condition information, the driving condition score is set higher as the difficulty degree for the driver in handling of the electronic conference becomes higher based on the driving condition information; and generates conference handling difficulty degree information indicating the difficulty degree based on the movement condition score set and the driving condition score set in a case where the processor recognizes that the driver is engaged in the electronic conference with the outside participant, transmits the movement condition information, the driving condition information, and the conference handling difficulty degree information generated to the terminal device, and makes a display of the terminal device to display the movement condition information, the driving condition information, and the conference handling difficulty degree information.

\* \* \* \* \*